United States Patent [19]

Sommer

[11] Patent Number: 5,487,456

[45] Date of Patent: Jan. 30, 1996

[54] PRESS DRIVE WITH OIL SHEAR CLUTCH/BRAKE DRIVES WITH INTERNAL FLYWHEEL BRAKE

[75] Inventor: Gordon M. Sommer, Grosse Pointe Shores, Mich.

[73] Assignee: Sommer Company, Warren, Mich.

[21] Appl. No.: 271,485

[22] Filed: Jul. 7, 1994

[51] Int. Cl.⁶ .................................................. F16D 67/04
[52] U.S. Cl. .................. 192/18 A; 192/12 C; 192/109 R
[58] Field of Search ............................... 192/18 A, 12 C, 192/18 R, 70.12, 85 AA, 109 R, 113.34

[56] References Cited

U.S. PATENT DOCUMENTS

| | | |
|---|---|---|
| 1,623,349 | 4/1927 | Knutsen . |
| 2,441,543 | 5/1948 | Longfield . |
| 2,918,832 | 12/1959 | Meyers . |
| 3,089,574 | 5/1963 | Howard . |
| 3,246,725 | 4/1966 | Brashear, Jr. . |
| 3,473,639 | 10/1969 | Becker et al. . |
| 3,487,438 | 12/1969 | Becker et al. . |
| 3,487,726 | 1/1970 | Burnett . |
| 3,494,450 | 2/1970 | Mankowsky et al. . |
| 3,614,999 | 10/1971 | Sommer . |
| 3,696,898 | 10/1972 | Sommer . |
| 3,713,517 | 1/1973 | Sommer . |
| 3,835,971 | 9/1974 | Spanke et al. . |
| 3,924,715 | 12/1975 | Cory . |
| 3,946,840 | 3/1976 | Sommer . |
| 3,970,176 | 7/1976 | Bucksch . |
| 3,971,461 | 7/1976 | Conroy et al. . |
| 4,067,427 | 1/1978 | Cackley . |
| 4,096,931 | 6/1978 | Whitehurst . |
| 4,122,926 | 10/1978 | Spanke et al. ........................ 192/18 A |
| 4,135,611 | 1/1979 | Spanke . |
| 4,171,038 | 10/1979 | Sommer . |
| 4,183,425 | 1/1980 | Sommer . |
| 4,186,626 | 2/1980 | Chamberlain . |
| 4,186,827 | 2/1980 | Spanke . |
| 4,223,774 | 9/1980 | Sommer . |
| 4,296,650 | 10/1981 | Kalns . |
| 4,317,512 | 3/1982 | Sato . |
| 4,346,796 | 8/1982 | Ueno . |
| 4,353,448 | 10/1982 | Sommer . |
| 4,356,900 | 11/1982 | Sommer . |
| 4,377,222 | 3/1983 | Sommer . |
| 4,422,540 | 12/1983 | Sommer . |
| 4,424,887 | 1/1984 | Sommer . |
| 4,432,443 | 2/1984 | Sommer . |
| 4,456,109 | 6/1984 | Bottomley et al. . |
| 4,458,794 | 7/1984 | Yater . |
| 4,460,075 | 7/1984 | Sommer . |
| 4,472,077 | 9/1984 | Sommer . |
| 4,493,613 | 1/1985 | Sommer . |
| 4,494,635 | 1/1985 | Sommer . |
| 4,496,032 | 1/1985 | Sommer . |
| 4,506,772 | 3/1985 | Sommer . |
| 4,516,444 | 5/1985 | Herr, Jr. . |
| 4,527,681 | 7/1985 | Sommer . |
| 4,577,738 | 3/1986 | Yater . |
| 4,598,804 | 7/1986 | Sommer . |
| 4,552,255 | 11/1985 | Sommer . |
| 4,600,368 | 7/1986 | Sommer . |
| 4,601,640 | 7/1986 | Sommer . |
| 4,607,736 | 8/1986 | Kelley . |
| 4,616,739 | 10/1986 | Sommer . |
| 4,643,282 | 2/1987 | Edl . |
| 4,644,819 | 2/1987 | Zugel . |
| 4,693,350 | 9/1987 | Sommer . |

(List continued on next page.)

FOREIGN PATENT DOCUMENTS

| | | |
|---|---|---|
| 1437609 | 6/1976 | United Kingdom . |
| 2032022A | 4/1980 | United Kingdom . |

*Primary Examiner*—Richard M. Lorence
*Attorney, Agent, or Firm*—Harness, Dickey & Pierce

[57] ABSTRACT

A base unit for driving a press is disclosed. The unit uses two hydraulic actuated oil shear brake/clutch units which are in coaxial nested relationship. The basic unit provides a core assembly which can easily be modified or adapted to be mated with any type of press drive. The unit provides the normal start-stop function of a press drive using the two brake/clutch units as well as a flywheel braking function utilizing the same two brake/clutch units.

13 Claims, 2 Drawing Sheets

U.S. PATENT DOCUMENTS

| | | |
|---|---|---|
| 4,739,865 | 4/1988 | Yater et al. . |
| 4,765,448 | 8/1988 | Sommer . |
| 4,781,543 | 11/1988 | Sommer . |
| 4,785,926 | 11/1988 | Matson . |
| 4,865,172 | 9/1989 | Sommer . |
| 4,921,078 | 5/1990 | Sommer . |
| 5,186,288 | 2/1993 | Sommer . |
| 5,190,129 | 3/1993 | Sommer ............................ 192/18 A |
| 5,194,057 | 3/1993 | Sommer . |
| 5,195,623 | 3/1993 | Sommer . |
| 5,285,879 | 2/1994 | Sommer . |
| 5,291,977 | 3/1994 | Sommer . |
| 5,323,888 | 6/1994 | Sommer . |

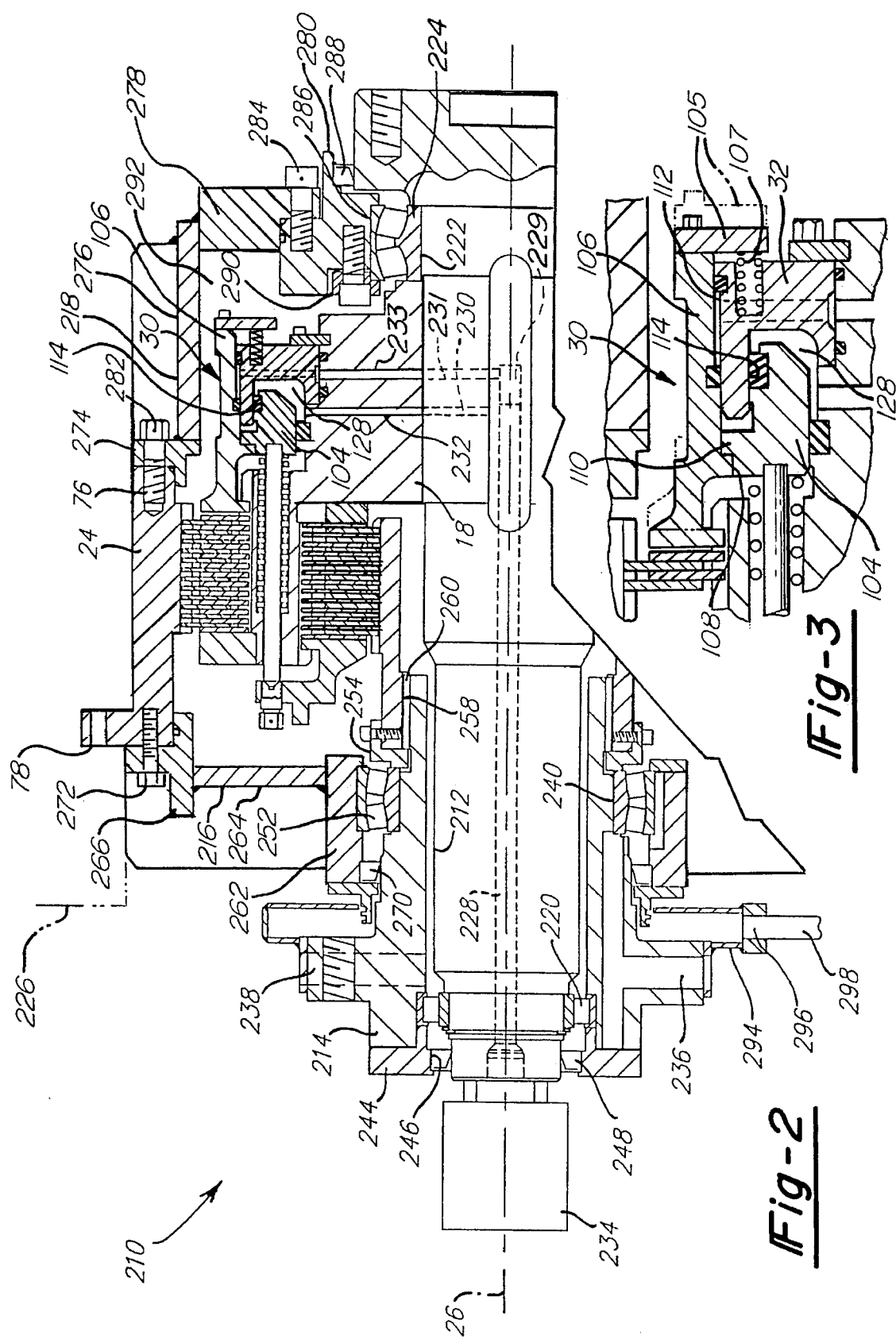

PRESS DRIVE WITH OIL SHEAR CLUTCH/BRAKE DRIVES WITH INTERNAL FLYWHEEL BRAKE

FIELD OF THE INVENTION

The present invention relates to press drives. More particularly, the present invention relates to a single speed press drive using an oil shear clutch/brake unit which includes an internal flywheel brake.

BACKGROUND OF THE INVENTION

Dry friction clutch/brakes depend upon the rubbing of a dry friction material against dry reaction members to operate a press by selectively connecting a drive shaft of the press to a continuously rotating flywheel to start the press and selectively connecting the drive shaft to a non-rotatable or fixed member to stop the press. This rubbing action causes wearing of both the friction material and the reaction members as well as heat generation within these members. The faster the press operates and the faster the flywheel rotates, the greater the amount of wear and heat which is generated. This generation of heat and the associated wear requires periodic gap adjustment to keep the press operating correctly. In addition, there was no consideration given in the prior art dry friction clutch/brake units to an integral braking system for the flywheel itself. The braking system for the flywheel was normally done by a separate system external to the clutch/brake press drive.

The problems associated with the dry friction clutch/brakes led to the development of the oil shear brake and clutch drives. The oil shear brake and clutch drives use a hydraulic shearing action between two adjacent plates rather than the friction between the plates to transmit power. The oil shear system offers the advantages of little or no wear of the clutch or brake plates and virtually no brake fade. This provides a more precise operation of the press and dramatically increases press up-time. The oil film between the plates absorbs the heat generated by start-stops of the press. This removal of heat offers the advantages that there is now no practical limit in the press trip rate or the flywheel speed.

The oil shear clutch and brake systems have solved numerous problems associated with press drives, but there has been no consideration given to the braking of the flywheel. The prior art clutch/brakes were designed to connect and release the flywheel to the drive shaft or the press. Braking of the flywheel itself was accomplished by a separate brake unit, exterior to the oil shear clutch/brake unit and normally designed as a dry friction brake. The dry friction brake for the flywheel has all of the disadvantages of dry friction brakes mentioned above but also includes the problems associated with brake dust. When braking the flywheel, brake dust is released into the air. Since the presses are operating within a closed building, this contamination and polluting of the interior air is another problem which must be addressed.

Accordingly, there is a need for a clutch/brake assembly which utilizes oil shear technology for connecting the driveshaft of the press to the flywheel, but also incorporates a braking system operating with the oil shear system for braking of the flywheel.

SUMMARY OF THE INVENTION

The present invention provides the art with a press drive system which uses an oil shear clutch and brake assembly to both drive the press and brake the flywheel. In the present invention, the flywheel is free to rotate when the press is stopped or when the press is being driven. The press is stopped when the brake is applied and the clutch is released. The press is driven by the flywheel when the brake is released and the clutch is engaged. The present invention provides the option of applying the brake and engaging the clutch simultaneously in order to brake the flywheel.

Other advantages and objects of the present invention will become apparent to those skilled in the art from the subsequent detailed description, appended claims and drawings.

DESCRIPTION OF THE DRAWING

In the drawings which illustrate the best mode presently contemplated for carrying out the present invention:

FIG. 2 is a side view, partially in cross section, of the a basic unit in FIG. 1 modified for adapting a press when the clutch/brake unit is mounted between bearings; and FIG. 3 is an enlarged view of the multi-function clutch engagement member of the present invention.

DETAILED DESCRIPTION OF THE INVENTION

Figure 1:
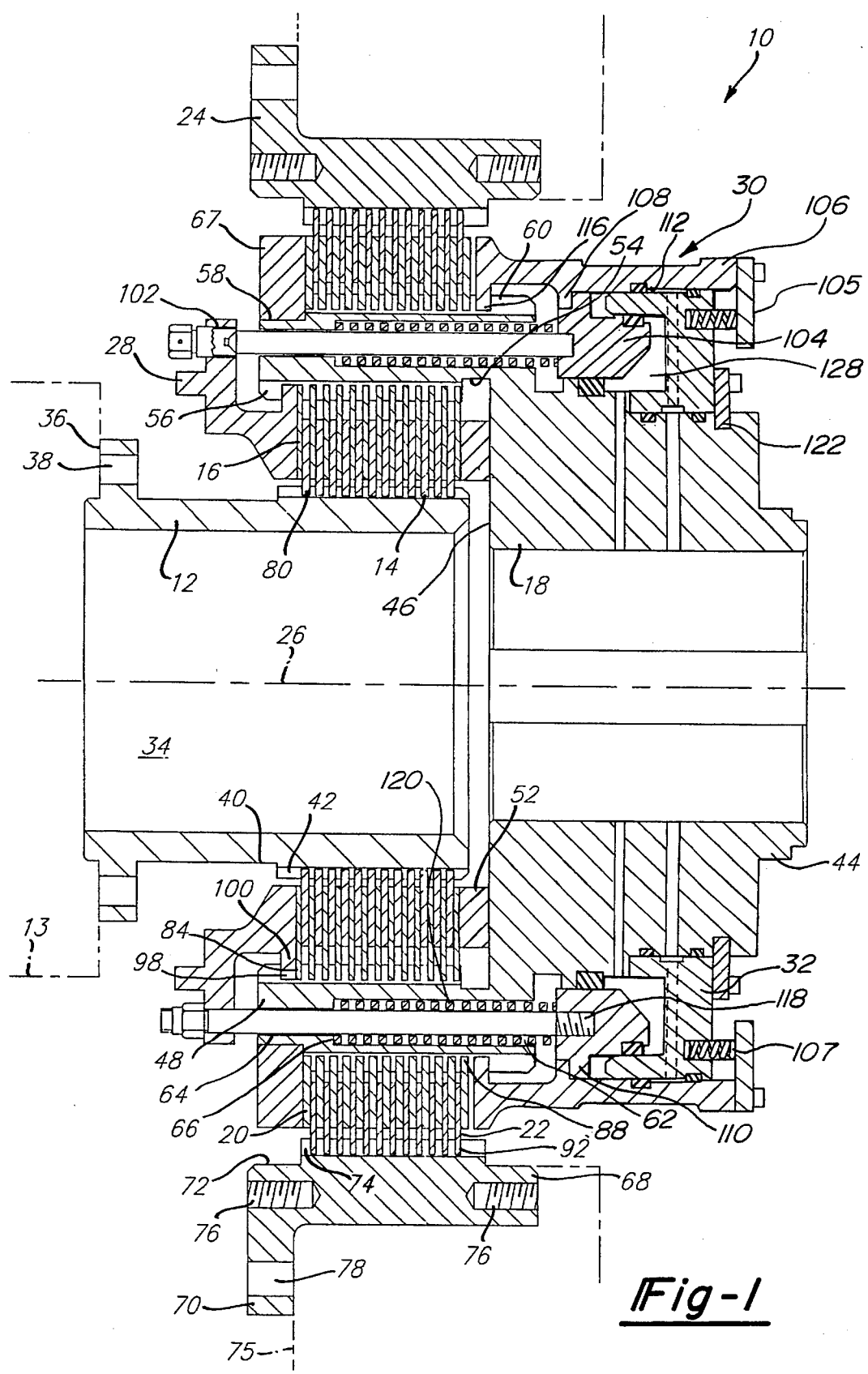
FIG. 1 is a side view, partially in cross section, of the basic unit for a press drive in accordance with the present invention.

The clutch/brake apparatus of the present invention begins with the basic unit shown in FIG. 1 and designated by reference numeral 10. The embodiment shown in FIG. 1 is similar to the clutch/brake apparatus described in U.S. Pat. No. 5,190,129, the disclosure of which is hereby incorporated herein by reference. The detailed description for FIG. 2 will describe for exemplary purposes, an embodiment which incorporates clutch/brake apparatus 10 shown in FIG. 1. This embodiment is being included to illustrate one example of how clutch/brake apparatus 10 can be incorporated into a specific design of a press. It is to be understood that it is possible to adapt clutch/brake apparatus 10 to virtually any design of press without deviating from the scope and fair meaning of the present invention.

Referring now to FIG. 1, clutch/brake apparatus 10 includes a housing or brake reaction cylinder 12, a first plurality of brake plates 14, a second plurality of brake plates 16, output means in the form of drive housing 18, a first plurality of clutch plates 20, a second plurality of clutch plates 22, input means in the form of flywheel drive 24, a brake engagement member 28, a clutch engagement member 30 and an annular ring 32.

Brake reaction cylinder 12 defines a central axis 26 and forms an internal cavity 34 which is utilized to provide access to drive housing 18. One end of brake reaction cylinder 12 is adapted to be fixedly mounted to a frame 13 or other non-rotating member of the press or apparatus being driven. The embodiment shown in FIG. 1 includes a flange 36 extending radially from brake reaction cylinder 12 for mounting to frame 13. A plurality of mounting holes 38 extend through flange 36 in order to facilitate the attachment to frame 13. An outside surface 40 of the end of reaction cylinder 12 opposite to flange 36 includes spline means 42 for interfacing with the first plurality of brake plates 14.

Drive housing 18 serves as the output means and is comprised of a first annular section 44 and a second annular section 48. First annular section 44 is coaxial with center axis 26 and acts as the connecting member for the drive shaft (not shown) of the press being driven as will be described later herein for the specific press design. First annular section 44 includes a radially extending face 46 adapted for mounting a brake reaction pad 52. Second annular section 48 extends axially from the outside of first annular section 44. An internal surface 54 of second annular section 48 includes spline means 56 for locating the second plurality of brake plates 16. An outside surface 58 of second annular section 48 includes spline means 60 for locating the first plurality of clutch plates 20. Second annular section 48 further includes a plurality of circumferentially spaced axially extending spring bores 62 and a plurality of circumferentially spaced axially extending connecting rod bores 64. Connecting rod bores 64 are equal in number to, coaxial with and smaller in diameter than the plurality of spring bores 62 thus forming a spring seat 66. Spring bores 62 cooperate with connecting rod bores 64 to extend completely through second annular section 48. A clutch reaction ring 67 is fixedly attached to the end of second annular section 48 and extends radially outward from second annular section 48.

Flywheel drive 24 serves as the input means and is comprised of an annular section 68 and a circular flange 70. An interior surface 72 of annular section 68 includes spline means 74 for locating the second plurality of clutch plates 22. Circular flange 70 extends radially outward from annular section 68. Flywheel drives 24 is adapted to be fixedly attached to a flywheel 75 of the press being driven. The embodiment shown in FIG. 1 includes a plurality of threaded holes 76 circumferentially spaced and located on both ends of annular section 68. In addition, circular flange 70 includes a plurality of circumferentially spaced mounting holes 78.

The first plurality of brake plates 14 have spline means 80 located on their interior surface. Spline means 80 cooperates with spline means 42 of brake reaction cylinder 12 to locate the first plurality of brake plates 14 on brake reaction cylinder 12 such that rotation with respect to reaction cylinder 12 is prohibited but brake plates 14 are allowed to move axially. Interjected or interleaved between the first plurality of brake plates 14 are the second plurality of brake plates 16 which include spline means 84 on their exterior surface. Spline means 84 cooperates with spline means 56 of drive housing 18 to locate the second plurality of brake plates 16 in drive housing 18 such that rotation with respect to drive housing 18 is prohibited but brake plates 16 are allowed to move axially.

The first plurality of clutch plates 20 have spline means 88 located on their interior surface. Spline means 88 cooperates with spline means 60 of drive housing 18 to locate the first plurality of clutch plates 20 on drive housing 18 such that rotation with respect to drive housing is prohibited but clutch plates 20 are allowed to move axially. Interjected or interleaved between the first plurality of clutch plates 20 are the second plurality of clutch plates 22 which have spline means 92 on their exterior surface. Spline means 92 cooperates with spline means 74 of flywheel drive 24 to locate the second plurality of clutch plates 22 in flywheel drive 24 such that rotation with respect to flywheel drive 24 is prohibited but clutch plates 22 are allowed to move axially.

Brake engagement member 28 is located adjacent to the first and second plurality of brake plates 14 and 16, respectively, such that brake plates 14 and 16 are disposed between brake engagement member 28 and brake reaction pad 52 mounted to drive housing 18. The interior surface of brake engagement member 28 has an outwardly extending flange 98 which includes spline means 100. Spline means 100 cooperates with spline means 56 of drive housing 18 to locate brake engagement member 28 in drive housing 18 such that rotation with respect to drive housing 18 is prohibited but brake engagement member 28 is allowed to move axially. Brake engagement member 28 includes a plurality of circumferentially spaced mounting holes 102 for mounting a plurality of connecting rods 118 as will be described later herein.

Clutch engagement member 30 is comprised of a first annular member 104 and a second annular member 106. First annular member 104 is slidingly and sealingly engaged with the exterior surface of first annular section 44 or drive housing 18. First annular member 104 includes a stepped portion 108, best shown in FIG. 3, located on the exterior surface of member 104 for engagement with second annular member 106 as will be described later herein. Second annular member 106 is slidingly and sealingly received over annular ring 32 and slidingly received over first annular member 104. A stop ring 105 extends radially inward from second annular member 106 to limit the movement of second annular member 106 and provide a reaction member for a plurality of return springs 107. Return springs 107 bias second annular member 106 to the right as shown in FIG. 1. The interior surface of second annular member 106 includes spline means 116. Spline means 116 cooperates with spline means 60 of drive housing 18 to locate second annular member 106 on drive housing 18 such that rotation with respect to drive housing it is prohibited but second annular member 106 is allowed to move axially. Second annular member 106 is located adjacent to the first and second plurality of clutch plates 20 and 22, respectively, such that clutch plates 20 and 22 are disposed between clutch reaction ring 67 and second annular member 106 of clutch engagement member 30. Second annular member 106 includes a stepped portion 110 which mates with stepped portion 108 of first annular member 104 to form a last-motion drive means such that first annular member 104 is operable to drive second annular member 106 to the left as shown in FIG. 1. The biasing of return springs 107 maintains the engagement of stepped portions 108 and 110.

First annular member 104 of clutch engagement member 30 is fixedly attached to brake engagement member 28 by the plurality of connecting rods 118. Connecting rods 118 extend through spring bores 62 and connecting rod bores 64 of drive housing 18 and are fixedly secured to both first annular member 104 and brake engagement member 28. Disposed within spring bore 62 and surrounding each of the plurality of connecting rods 118 are a plurality of coil springs 120. Coil springs 120 react against spring seat 66 on one end and react against first annular member 104 on the other end such that first annular member 104 and brake engagement member 28, by means of connecting rods 118, are biased towards the right as shown in FIG. 1.

Annular ring 32 is fixedly and sealingly attached to the exterior surface of first annular section 44 of drive housing 18 by an attachment ring 122. The outside surface of annular ring 32 is sealingly and slidably engaged with the inside surface of second annular member 106 of clutch engagement member 30 forming a sealed chamber 112. An internal surface 114 of annular ring 32 is sealingly and slidably engaged with the outside surface of first annular member 104 of clutch engagement member 30 forming a sealed chamber 128.

When engagement members 28 and 30 are biased to the right by the plurality of coil springs 120 and the plurality of return springs 107 as shown in FIG. 1, first and second brake plates 14 and 16 are clamped between brake engagement member 28 and brake reaction pad 52 thus prohibiting rotation of drive housing 18 by locking it to brake reaction cylinder 12. Flywheel drive 24 is free to rotate relative to drive housing 18 due to the lack of clamping force between clutch plates 20 and 22 by the biasing of clutch engagement member 30 to the right as shown in FIG. 1. This position is the starting position for the various operating modes described below.

The operation of clutch/brake apparatus 10 operating as a flywheel brake begins with apparatus 10 operating in the starting position described above. When pressurized fluid is supplied to sealed chamber 112, second annular member 106 of clutch engagement member 30 is moved to the left as shown in FIG. 1. First annular member 104 is stationary due to the biasing load of the plurality of coil springs 120. The movement to the left of second annular member 106 exerts a clamping force on clutch plates 20 and 22 between second annular member 106 and clutch reaction ring 67. The clamping force acts to brake flywheel 75 by locking flywheel 75 to drive housing 18 which is in turn locked to brake reaction cylinder 12. Rotation of flywheel 75 is thus prohibited as it is locked to brake reaction cylinder 12.

The operation of clutch/brake apparatus 10 operating as a press drive begins with apparatus 10 operating in the starting position. When pressurized fluid is supplied to chamber 128, engagement members 28 and 30, including both first and second annular members 104 and 106, are moved to the left as shown in FIG. 1. The movement to the left of brake engagement member 28 and clutch engagement member 30 releases the clamping force on brake plates 14 and 16 by brake engagement member 28 against brake reaction pad 52 and starts a clamping force between second annular member 106 of clutch engagement member 30 and clutch reaction ring 67 on clutch plates 20 and 22. Drive member 18 is now free to rotate relative to brake reaction cylinder 12 and is locked to or rotates with flywheel drive 24.

The detailed description above describes the basic operation of clutch/brake apparatus 10. The operation of apparatus 10 is identical throughout the specification. The following description details are a specific example of a press design which is adapted to incorporate clutch/brake apparatus 10.

FIG. 2 shows the clutch/brake apparatus 10 adapted to be used as an integral unit 210. The integral unit 210 is needed when clutch/brake apparatus 10 is to be mounted between bearings.

In this embodiment, the press is adapted with a driveshaft 212, a support housing 214, a first support arm 216 and a second support arm 218. Driveshaft 212 is fixedly mounted to drive housing 18 of clutch/brake apparatus 10. Driveshaft 212 is rotatably mounted to support housing 214 by a bearing 220 and provides a mounting surface 222 for bearing 224 for flywheel 226. Also provided within drive shaft 212 is oil passage 228 which extends axially through drive shaft 212 to cooperate with an oil passage 230 which extends generally perpendicular to center axis 26, these passages 228 and 230 cooperate with an oil passage 232 which extends through drive housing 18 and terminates in sealed chamber 128. An additional oil passage 229 extends axially through driveshaft 212 to cooperate with an oil passage 231 which extends generally perpendicular to center axis 26, these passages 229 and 231 cooperate with an oil passage 233 which extends through drive housing 18 and first annular member 104 and terminates in sealed chamber 112. A rotary oil coupling 234 is rotatably mounted on the end of drive shaft 212 and is connected to a supply of pressurized fluid (not shown) which enables the activation of the brake and clutch drive mechanism including the interior flywheel brake as described above.

Support housing 214 is fixedly attached to a non-rotatable section (not shown) of the press being adapted. Support housing 214 includes an oil inlet passage 236, an oil outlet passage 238, a bearing mounting surface 240 and spline means 258. An end cap 244 is mounted on one end of the support housing 214 and provides a mounting surface 246 for seal 248. Seal 248 is stationary with respect to support housing 214 and rides against the outside surface of driveshaft 212. Bearing mounting surface 240 is used to mount bearing 252 for flywheel 226. Bearing 252 is held in position by an annular ring 254 which is fixedly attached to brake reaction cylinder 12. The exterior surface of the support housing 214 defines spline means 258 for engaging brake reaction cylinder 12 of the brake/clutch unit 10. For this embodiment, brake reaction cylinder 12 is equipped with an internal spline 260 for fixedly engaging support housing 214 and thus prohibiting brake reaction cylinder 12 from rotating.

First support arm 216 is comprised of an annular section 262, a disk section 264 and an annular ring 266. Annular section 262 has an internal surface which is adapted to mount bearing 252 as well as a seal 270. Seal 270 rotates with first support arm 216 and rides against support housing 214. Disk section 264 is fixedly and sealingly attached at one end to annular section 262 and to annular ring 266 at the other. Annular ring 266 is adapted to be fixedly and sealingly connected by threaded holes 76 to flywheel drive 24 by bolts 272. Flywheel 226 is fixedly attached to flywheel drive 24 using holes 78.

Second support arm 218 is comprised of an annular ring 274, an annular section 276, an annular ring 278 and a bearing mount 280. Annular ring 274 is adapted to be fixedly and sealingly connected by threaded holes 76 to flywheel drive 24 by bolts 282. Annular section 276 is fixedly and sealingly connected to annular ring 274 at one end and to annular ring 278 at the other. Annular ring 278 is sealingly and fixed connected to bearing mount 280 by a plurality of bolts 284. Bearing mount 280 has an internal surface 286 which is adapted for mounting bearing 224 as well as seal 288. Seal 288 rotates with second support arm 218 and rides against driveshaft 212. Bearing 224 is held in place by a retaining ring 290 which is fixedly mounted to bearing mount 280.

Support housing 214, first support arm 216, second support arm 218, driveshaft 212 and clutch/brake apparatus 10 cooperate to form a sealed chamber 292. Sealed chamber 292 is sealed from the outside by seal 248, seal 270 and seal 288. Oil passage 236 communicates with sealed chamber 292 for allowing cooling oil to enter chamber 292 and oil passage 238 communicates with sealed chamber 292 for allowing cooling oil to exit chamber 292. By connecting oil passage 236 and 238 to an oil pump (not shown), a continuous supply of cooled oil can be provided to dissipate the heat generated during the operation of the clutch/brake apparatus 10.

An oil dam 294 is attached to support housing 214 to accumulate any oil which may leak past seal 270. An outlet port 296 is provided which returns the accumulated oil to the reservoir (not shown) by a tube 298.

While the above detailed description describes the preferred embodiment of the present invention, it should be understood that the present invention is susceptible to modification, variation and alteration without deviating from the scope and fair meaning of the subjoined claims.

What is claimed is:

1. An oil-shear clutch/brake drive comprising:

a housing;

an input member rotatably disposed with respect to said housing;

an output member rotatably disposed with respect to said housing;

a brake disposed between said housing and said output member, said brake being movable between an applied condition where said output member is locked to said housing and a released condition where said output member can rotate relative to said housing;

a clutch disposed between said input member and said output member, said clutch being movable between an engaged condition where said input member is locked to said output member and a disengaged condition where said input member can rotate relative to said output member;

a clutch engagement member connected to said clutch to move said clutch between said engaged condition and said disengaged condition;

a brake engagement member connected to said brake to move said brake between said applied condition and said released condition, said brake engagement member being connected to said clutch engagement member;

brake biasing means for urging said brake engagement member to move said brake into said applied condition; and lost-motion drive means disposed between said brake engagement member and said clutch engagement member for allowing movement of said clutch engagement member totally independent of said brake biasing means and said brake engagement member.

2. The oil-shear clutch/brake unit of claim 1 wherein, said output member positions said brake radially inward of and in coaxial nested relation to said clutch.

3. The oil-shear clutch/brake unit of claim 1 further comprising clutch biasing means for urging said clutch engagement member to move said clutch into said disengaged position.

4. The oil-shear clutch/brake unit of claim 1 wherein, said brake comprises a plurality of interleaved first friction disks alternately splined, respectively, to said housing and said output member.

5. The oil-shear clutch/brake unit of claim 1 wherein, said clutch comprises a plurality of interleaved second friction disks alternately splined, respectively, to said input member and said output member.

6. An oil-shear clutch/brake drive comprising:

a housing;

an input member rotatably disposed with respect to said housing;

an output member rotatably disposed with respect to said housing;

a brake disposed between said housing and said output member, said brake being movable between an applied condition where said output member is locked to said housing and a released condition where said output member can rotate relative to said housing;

a clutch disposed between said input member and said output member, said clutch being movable between an engaged condition where said input member is locked to said output member and a disengaged condition where said input member can rotate relative to said output member;

a clutch engagement member connected to said clutch to move said clutch between said engaged condition and said disengaged condition;

a brake engagement member connected to said brake to move said brake between said applied condition and said released condition, said brake engagement member being connected to said clutch engagement member;

brake biasing means for urging said brake engagement member to move said brake into said applied condition;

a first pressure chamber adjacent said clutch engagement member to selectively move said clutch engagement member independent of said brake biasing means and said brake engagement member to engage said clutch; and a second pressure chamber adjacent said brake engagement member to selectively move said brake engagement member to release said brake, said brake engagement member simultaneously moving said clutch engagement member to engage said clutch.

7. The oil-shear clutch/brake unit of claim 6 wherein, said output member positions said brake radially inward of and in coaxial nested relation to said clutch.

8. The oil-shear clutch/brake unit of claim 6 further comprising clutch biasing means for urging said clutch engagement member to move said clutch into said disengaged position.

9. The oil-shear clutch/brake unit of claim 6 wherein, said brake comprises a plurality of interleaved first friction disks alternately splined, respectively, to said housing and said output member.

10. The oil-shear clutch/brake unit of claim 6 wherein, said clutch comprises a plurality of interleaved second friction disks alternately splined, respectively, to said input member and said output member.

11. An oil-shear clutch/brake drive comprising:

a housing;

an input member rotatably disposed with respect to said housing;

an output member rotatably disposed with respect to said housing, said output member having a first and a second stop;

a clutch disposed between said input member and said output member, said clutch being movable between an engaged condition where said input member is locked to said output member and a disengaged condition where said input member can rotate relative to said output member;

a brake disposed between said housing and said output member, said brake being movable between an applied condition where said output member is locked to said housing and a released condition where said output member can rotate relative to said housing, said brake being disposed radially inward of and in coaxial nested relation to said clutch;

a clutch engagement member connected to said clutch to move said clutch between said engaged condition and said disengaged condition, said clutch engagement member being slidingly disposed on said output member and movable towards said first stop to move said clutch into said engaged condition;

a brake engagement member connected to said brake to move said brake between said applied condition and said released condition, said brake engagement member being connected to said clutch engagement member, said brake engagement member being slidingly disposed within said output member and movable towards said second stop to move said brake into said released condition;

brake biasing means to urge said brake engagement member to move said brake into said applied condition;

clutch biasing means to urge said clutch engagement member to move said clutch into said disengaged condition;

a first pressure chamber adjacent said clutch engagement member to selectively move said clutch engagement member independent of said brake biasing means and said brake engagement member to engage said clutch; and a second pressure chamber adjacent said brake engagement member to selectively move said brake engagement member to release said brake, said brake engagement member simultaneously moving said clutch engagement member to engage said clutch.

12. The oil-shear clutch/brake unit of claim 11 wherein, said brake comprises a plurality of interleaved first friction disks alternately splined, respectively, to said housing and said output member.

13. The oil-shear clutch/brake unit of claim 11 wherein, said clutch comprises a plurality of interleaved second friction disks alternately splined, respectively, to said input member and said output member.

* * * * *